INVENTORS.
RICHARD A. HORN
HOWARD I. COLE
BY
ATTORNEY

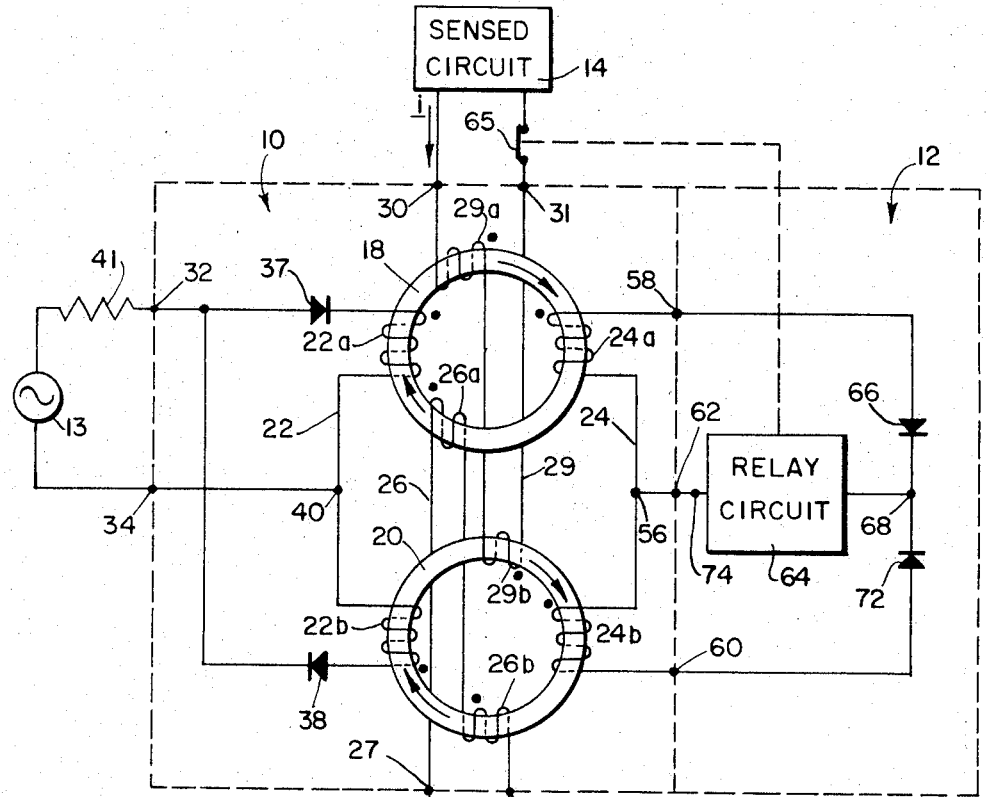
FIG. 1
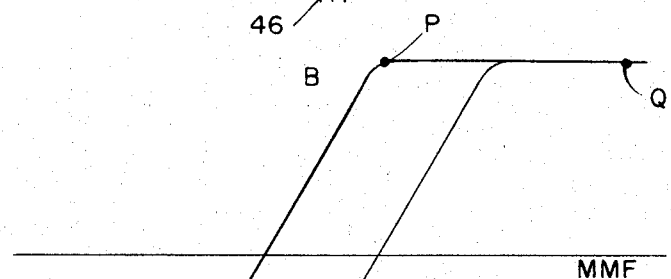
FIG. 2
INVENTORS.
RICHARD A. HORN
HOWARD I. COLE,
BY
ATTORNEY

INVENTORS
RICHARD A. HORN
HOWARD I. COLE
BY
ATTORNEY

United States Patent Office 3,374,398
Patented Mar. 19, 1968

3,374,398
MAGNETIC CIRCUIT PROTECTIVE DEVICE
Richard A. Horn, Hudson, and Howard I. Cole, New Ipswich, N.H., assignors to Sanders Associates, Inc., Nashua, N.H., a corporation of Delaware
Filed Jan. 7, 1966, Ser. No. 519,281
20 Claims. (Cl. 317—9)

ABSTRACT OF THE DISCLOSURE

Apparatus is herein provided for sensing within a time limit measured in microseconds, both D.C. and A.C. currents and voltages which exceed predetermined limits. The protective circuit uses a magnetic amplifier for its high gain capabilities and low power consumption. The magnetic amplifier operates at a point in the saturation region on the flux vs. magnetomotive curve, the operating point being determined by the current in the primary or gate winding, and a bias winding. The current of the monitored circuit passes through a sense winding and generates a flux opposite in polarity to the flux produced by the gate winding and bias winding. When the current in the sense winding exceeds a predetermined limit the resulting flux will shift the operating point onto the linear portion of the flux vs. magnetomotive curve and, through transformer action, the varying primary flux will produce a voltage in the output winding which will activate the appropriate protective circuits.

---

This invention relates to a magnetic circuit monitor. It relates more particularly to means for sensing currents and voltages which exceed predetermined limits. The monitor is especially suited for, though by no means limited to, the protection of electric circuits from overloads.

Normally, overload protection is accomplished with the aid of current limiting fuses or circuit breakers. While these components are quite satisfactory in some applications, in others, their slow reaction time definitely militates against their use. For example, it may take two or three minutes to disable a circuit if the current therein is only slightly in excess of the predetermined limiting value. This delay cannot be tolerated in certain sensitive circuits.

There are more sophisticated overload protection devices in use which employ controlled circuits with thyratrons, silicon controlled rectifiers or the like. These control circuits have two major drawbacks. First, they usually consume an appreciable amount of power from the circuit being monitored. Second, they tend to be quite sensitive to temperature variations, which affect both the response time and the response point of the circuits. They are further disadvantaged in that they have strict operating potential requirements. Moreover, being fairly elaborate, they are therefore expensive to make. Finally, they tend to be relatively large and bulky.

It is accordingly an object of this invention to provide an electric current-sensing monitor having very fast yet accurate response.

Another object of this invention is to provide a circuit monitor which draws negligible power from the circuit being monitored, and which, in fact, requires very little power to operate it.

A further object of this invention is to provide a circuit monitor which is small, rugged and reliable, yet relatively inexpensive to make.

Another object of this invention is to provide a circuit monitor which is flexible enough to be capable of monitoring D.C. circuits as well as relatively high frequency A.C. circuits.

A still further object of this invention is to provide a circuit monitor which is temperature stable.

A further object of the invention is to provide a circuit monitor which is versatile, having a number of applications in control and logic circuitry.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a schematic diagram of a magnetic circuit monitor embodying the principles of our invention;

FIG. 2 is a curve showing the variation of flux with magnetomotive force for the magnetic cores in the monitor of FIG. 1;

Figure 3:
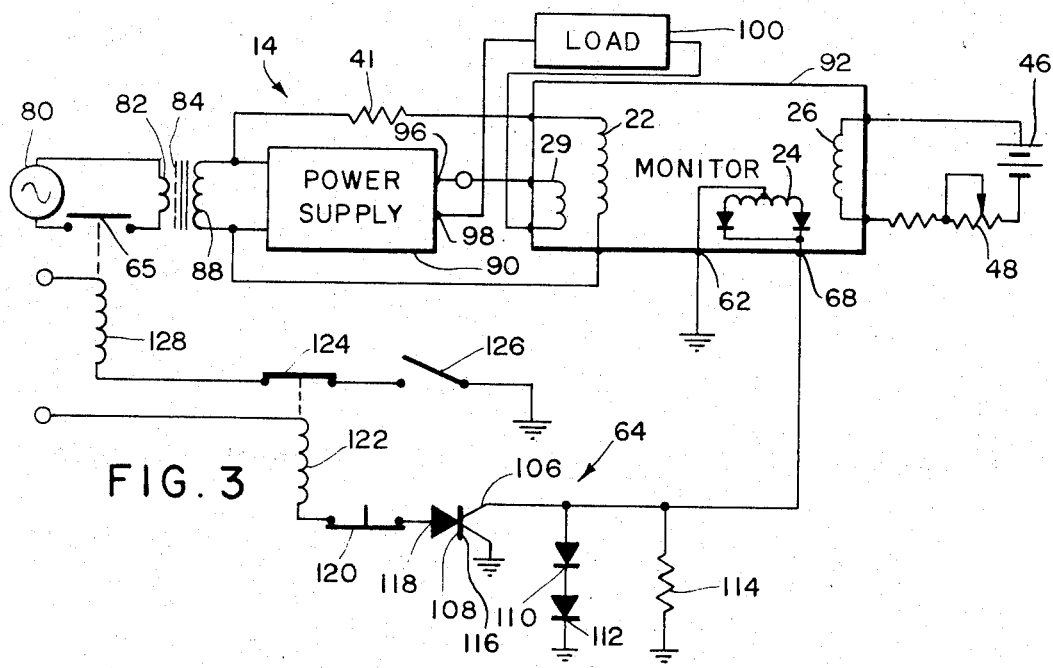
FIG. 3 is a schematic diagram showing the monitor used to protect against a D.C. overload.

Briefly, our monitor employs the basic principle of the magnetic amplifier with its advantages of high gain and low power consumption. As such, it uses the usual pair of matched magnetic cores. However, departing from conventional practice, the monitor is normally operated at a point well into one region of saturation. In arriving at this operating point, it sums the current in three field windings on each core. One of these windings carries alternating current which periodically drives the core to saturation.

The second winding carries a D.C. bias current which adjusts the operating point of each core within the saturated region. The third winding carries the signal to be sensed, and it is connected to oppose the effect of the bias winding. When the signal current in the third winding exceeds a predetermined limit, the core elements are brought out of saturation and the pulsating current in the first winding (along with any changes in the sensed signal) is coupled to an output winding on the cores. Within certain limits, the amplitude of the voltage induced in the output winding is proportional to the deviation of the sensed current from the predetermined limit. As a practical matter, however, the cores are driven into their opposite saturation regions so that a quantized or digital output appears across the output winding.

The output voltage can be used to actuate any conventional means for disabling the sensed circuit or performing other functions. Thus, the monitor described herein can be used not only as an A.C. or D.C. current or voltage limiting device, but also has application in sequence control and logic circuits.

Referring now to FIG. 1 of the drawing, the monitor comprises a sensing section indicated generally at 10 and an output section indicated generally at 12. Although it also has other applications that will be described later, we will first describe the monitor as used to prevent current overload in a circuit indicated generally at 14. If the current in circuit 14 exceeds a predetermined value in relation to a predetermined bias control, a signal from a reference source 13 is coupled to the output section 12 for operating a suitable mechanism to de-energize the overloaded circuit 14. Or on the other hand, if the rate of change of the signal in circuit 14 is much greater than that of the signal from source 13, the rate of change in the circuit 14 will induce a voltage in the output section 12.

The setting of a bias circuit indicated generally at 16 connected to the sensing section 10 controls the particular current value in circuit 14 that will cause the monitor to de-energize circuit 14.

The sensing section 10 comprises more particularly a pair of similar toroidal magnetic cores 18 and 20. Cores 18 and 20 are formed of a material that can be placed in two states of saturation. However, it should be mentioned here that such material does not have to have a square hysteresis characteristic, although a sharp "knee" or corner between the saturated and unsaturated portions of the characteristic is highly desirable.

In accordance with the invention four windings are wound on the two cores 18 and 20. A gate winding 22 is wound on the left portions of the cores with one half 22a of the gate winding being on core 18 and the other half 22b of the winding being on core 20. The gate winding 22 is connected to the A.C. source 13 as will be described more particularly later. An output winding 24 is wound on the right hand portions of cores 18 and 20, with one half 24a of the winding on core 18 and the other half 24b on core 20. The upper and lower ends of the winding 24 are connected directly to the output terminals 58 and 60 respectively of sensing section 10. A connection is also made between the center tap 56 of winding 24 and a third output terminal 62 of sensing section 10. These three terminals of the sensing section 10 are connected to the output section 12 to be described later. The two windings 22 and 24 constitute the primary and secondary windings of a transformer and function much the same as the gate and output windings of a conventional magnetic amplifier. That is, when not saturated they couple changes in the input voltage from the source 13 to the output circuit 12.

The remaining two of the four aforementioned windings control the coupling between the windings 22 and 24. One of these, a bias winding 26, is wound around both of the cores 18 and 20. This winding 26 is connected via terminals 27 and 28 of section 10 to the bias circuit 16. The remaining winding 29 is wound around both core 18 and core 20. This winding 29 is connected via terminals 30 and 31 of section 10 to the circuit being monitored.

Alternating current from source 13 is applied via input terminals 32 and 34 of section 10 to the gate winding 22. The current is sufficient to place the cores 18 and 20 well into saturation during current pulses in the absence of other applied fields. The alternating current is first rectified and for this, a diode 37 is connected between terminal 32 and the upper end of winding 22 so as to pass forward current to the winding 22. A similar diode 38 is connected between the lower end of winding 22 and the terminal 32 so as to pass forward current to the terminal 32. The remaining input terminal 34 of section 10 is connected to center tap 40 on winding 22. The totality forms a self-regulating input to the cores 18 and 20.

With this arrangement, only the positive portion of the input is applied to winding portion 22a on core 18 while only the negative portion of the input is applied to the winding portion 22b on core 20. Accordingly, the input from source 13 produces alternately in the cores 18 and 20 a pulsating magnetic flux. This current is sufficient to place both cores well into saturation. Assuming that the core material has sufficient remanence, there will be essentially no change in magnetic flux due to the current from source 13 and no voltage will be induced in the output winding 24. In this condition, the impedance of the gate winding 22 is essentially zero, tending to produce an excessive current flow in winding 22. Accordingly, a current limiting resistor 41 is included between source 13 and terminal 32 to keep the current at a low level, but still high enough to saturate the cores.

The biasing circuit 16 sets the normal operating point of the cores 18 and 20 within the saturated region. Circuit 16 comprises simply a battery 46 or other D.C. source and a variable resistor 48, in series between the terminals 27 and 28. The variable resistor 48 adjusts the current in the winding 26 and thereby the magnetic bias in the cores 18 and 20.

Still referring to FIG. 1, the sensed circuit 14 may be a power supply or any other circuit whose output must be regulated. It is connected to terminal 30 and 31 of sensing section 10 so that its output current flows through the sense winding 29.

The sense winding 29 preferably consists of only a few turns of low resistance wire. Thus the circuit 14 being monitored does not have to supply any appreciable power to operate the monitor.

Refer now to FIG. 2 which shows the variation in magnetic flux (B) as a function of the net magnetomotive force (MMF) in each of the cores 18 and 20. As the net MMF increases, the flux in the cores also increases, but only up to the saturation point P (and P') of the cores. Beyond the saturation points, the flux remains essentially constant for any further increases in current in the field windings. Most preferably, the characteristic curve of the cores 18 and 20 has transition points or "knees" which are as abrupt as possible. It is apparent, therefore, that when the core is operating in the intermediate unsaturated region of the curve, changes in the current in any of the field windings 22, 26 and 29 will be coupled to the output winding 24. However, so long as the cores are maintained in the saturation region beyond point P (or P') changes in the currents in those windings produce a negligible flux change in the cores and accordingly a minor voltage is induced in the output winding 24 which is not sensed by the output circuit 12. On the other hand, when the current in one of the windings changes so as to move the magnetization of the core into the unsaturated region, a substantial voltage is induced in output winding 24.

The variable resistor 48 in bias circuit 16 sets the operating point on the characteristic curve of FIG. 2, about which the monitor will operate, by adjusting the current in winding 26. The proper setting of the resistor 48 is one which maintains the cores 18 and 20 at a point Q (or Q') on the curve which is beyond the corresponding saturation point P (or P') when the current $i$ in circuit 14 is at a normal level. So long as normal current levels below the predetermined threshold level persist in circuit 14, negligible voltage will appear at the output terminals 58, 60 and 62 of sensing section 10.

Specifically, the algebraic sum of the ampere turns in the windings 26 and 29 and the peak value of the ampere turns in winding 22 determines the operating point about which the A.C. component of the winding 22 current varies the magnetic field. The bias from winding 26 and the A.C. component of the current in winding 22 tend to drive the cores into saturation, while the current $i$ in winding 29 tends to shift the operating point Q (FIG. 2) back toward the transition point P. The resistor 48 is set so that the point Q is at least far enough beyond the transition point P, during normal operation of the circuit 14, that the A.C. component of the current in winding 22 does not shift the magnetization into the unsaturated portion of the characteristic during any part of the cycle. Large step-down ratios between windings 22 and 29 (e.g., 400:1) mean that the A.C. component of the source 13 voltage generates a negligible voltage in the sensed circuit 14 and thereby does not affect its operation.

Referring to FIGS. 1 and 2, once the operating point Q is set by resistor 48, it will shift only as the current $i$ in the sensed winding 29 changes. When this current becomes excessive, that is, increases sufficiently to overcome the bias afforded by winding 26, the magnetization shifts to the left and generally on through the unsaturated portion of the curve, i.e., to the left of the saturation point $P_1$. Specifically the magnetization curve is so sharp that even a small increase in sensed current above the predetermined threshold level suffices to drive the cores 18 and 20 to the opposite saturated state. There is thus a changing magnetic flux in each of the cores 18 and 20 due to the alternating current component in the gate winding 22, or to the current change in the sensed winding 29. This flux component induces an alternating output voltage in the winding 24 which appears at the output terminals 58, 60 and 62 of section 10.

More particularly, if the increase in the monitored current in winding 29 is very rapid, the flux change in the cores 18 and 20 resulting therefrom will induce a substantial output voltage in the winding 24. If the current change is so slow that it will not in itself induce a substantial output voltage, it will cause the magnetization of the cores to pass through the unsaturated region relatively slowly. This results in transformer action coupling the alternating current input from the source 13 to the output winding 24 and thereby providing the desired output signal. In the crossover region where the rate of change in monitored current is comparable to the frequency of the source 13, a combination of the two effects is obtained.

The number of ampere turns required in the sense winding 29 to bring the cores 18 and 20 out of saturation may be controlled by adjusting the point Q via the resistor 48 or by changing the number of turns in the bias winding 26. The magnitude of the current capable of being sensed by the monitor is determined by the number of turns in winding 29. If it is desired to make the device very sensitive to small current changes in the sensed circuit 14, the number of turns is increased to obtain the necessary ampere turns change in the cores 18 and 20. Generally, however, it is desirable to keep the number of turns small to minimize the power consumption in winding 29. A further reason for using a small winding 29 is to keep the frequency response of the monitor as high as possible. The frequency response is limited by, among other things, the distributed capacitance of the core windings.

The output section 12 may vary in its details depending on the particular application of the monitor. In the illustrated monitor used for current overload protection, the induced alternating voltage in the winding 24 is rectified in the output section 12 to a unidirectional voltage. This voltage is used to actuate a latch in relay circuit 64 which controls a normally closed switch 65 connected in series with circuit 14. More particularly, the output section 12 is shown to comprise a diode 66 connected between terminal 58 of section 10 and one terminal 68 of relay circuit 64. A similar diode 72 is connected between terminal 60 and terminal 58. Both diodes 66 and 72 are connected so as to pass forward current to circuit 64. The other terminal 74 of circuit 64 is connected to terminal 62 of section 10. The diodes 66 and 72 thus operate as a full wave rectifier to give maximum response.

Relay circuit 64 may be any one of a variety of well-known overload relay circuits of the type which, when triggered, energize a relay coil or an electronic relay and keep it energized until the relay circuit is reset. Thus, when circuit 64 is triggered by the output voltage from sensing section 10, it opens, for example, the normally closed relay switch 65 disabling the overload circuit 14.

Still referring to FIGS. 1 and 2, it will be obvious that our invention can also be used as a low limit protective device to sense a loss of current in the sensed circuit 14. In this case, the bias is set so that when the current fails in the circuit 14 or falls to some lower limit determined by the setting of resistor 48, the magnetization moves across the unsaturated region of the curve and a voltage is coupled to the output section 12 as described previously. This actuates the switch 65, again disabling circuit 14.

The current i in circuit 14 may be alternating current as well as direct current. In either case excess current in circuit 14 induces a voltage of winding 24 during an interval when one or both of the cores are unsaturated.

FIG. 3 depicts use of the monitor in an actual circuit to protect against a D.C. overload. The monitor terminal numbers here correspond with those in FIG. 1.

A.C. power from a source 80 is supplied to the primary winding 82 of a transformer 84 through a normally open relay switch 65. The secondary winding 88 of the transformer 84 is connected to a power supply 90 protected by the monitor 92.

The A.C. gate voltage for the monitor 92 is taken from the secondary winding 88 of the transformer and applied to the gate winding 22. The power supply output terminals 96 and 98 are connected to a load 100 in series with the monitor sense winding 29.

The terminals 62 and 68 of monitor 92 are connected respectively to ground and to the gate 106 of a silicon controlled rectifier 108. A pair of diodes 110 and 112 are connected as voltage limiters preventing application of excess voltage to the gate 106. Also, a resistor 114 is connected between gate 106 and ground. The cathode 116 of rectifier 108 is connected to ground while its anode 118 is connected via a normally closed reset switch 120 to one end of an overload relay coil 122. The other end of coil 122 is connected to a source of positive voltage. One side of an overload relay switch 124 actuated by coil 122 is connected to ground through an on-off switch 126. The other side of switch 124 leads to one end of the coil 128 which actuates the power relay switch 65. The other end of coil 128 is connected to a voltage source.

In operation, the on-off switch 126 is first closed to energize coil 128 and close switch 65. The power supply 90 is thus energized to supply current to the load 100.

Whenever the current through load 100 exceeds the predetermined limit, the monitor 92 develops an output signal at the terminal 68 as described above. This turns on the silicon controlled rectifier 108, energizing the overload relay coil 122. This, in turn, opens the relay switch 124, de-energizing the relay coil 128 to open switch 65 and shut down the system.

When the normal current levels are restored through the load 100, operation is resumed by opening the push button reset switch 120. This turns off the silicon controlled rectifier 108. It also de-energizes the overload relay coil 122 causing its switch 124 to close. By this, the relay coil 128 is again energized, thereby closing relay switch 65, restoring power to the supply 90.

Figure 4:
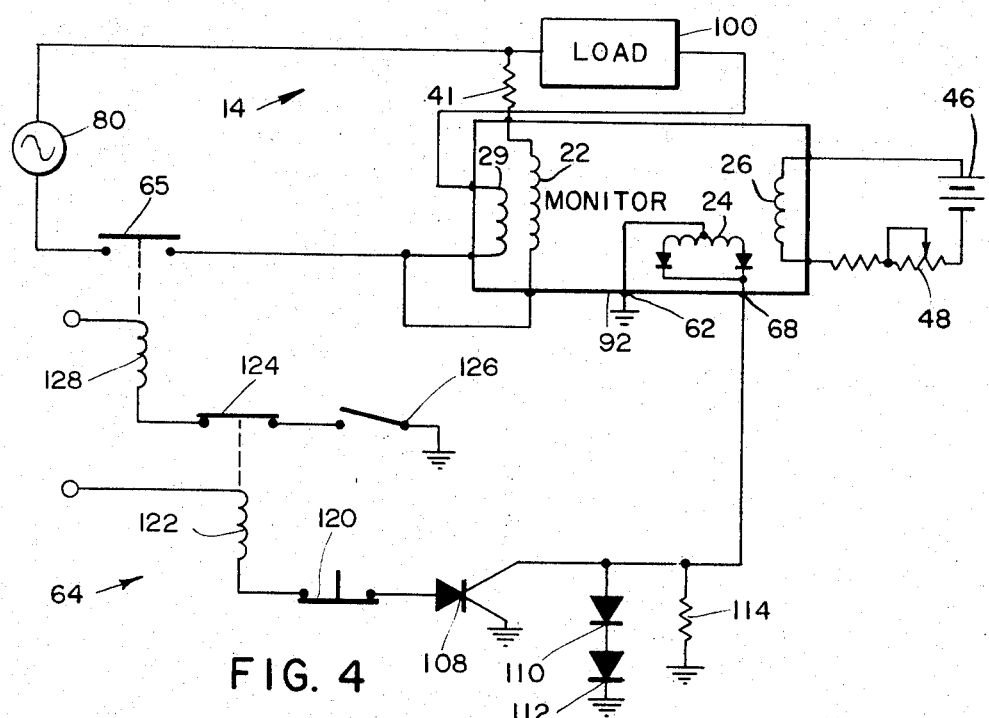
FIG. 4 is a similar diagram showing the monitor used to protect against an A.C. overload.

FIG. 4 shows use of the monitor in a circuit to protect against A.C. overload. The setup is exactly the same as the D.C. overload protection system disclosed in FIG. 3, except that the A.C. source 80 is connected directly by way of relay switch 65 to the load 100 to the monitor sense winding 29. The operation of the A.C. overload protection system is essentially identical to that of the D.C. overload device of FIG. 3.

Figure 5:
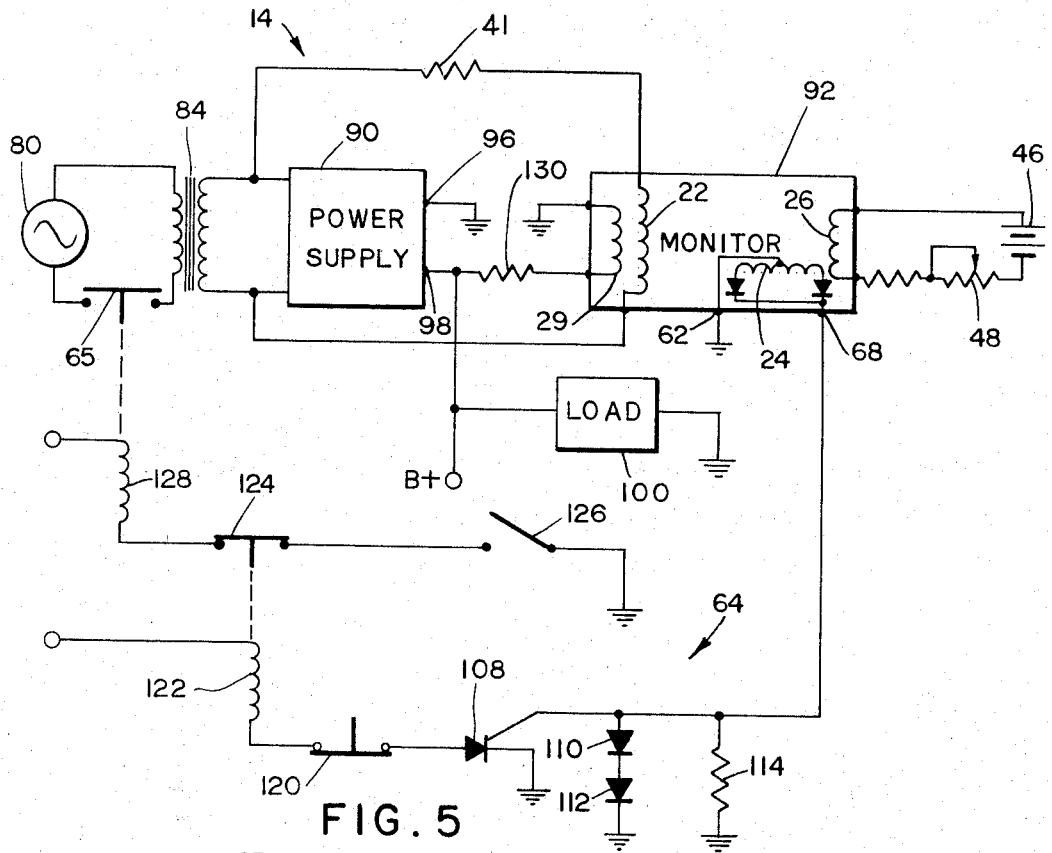
FIG. 5 is a similar diagram showing the monitor used for overvoltage protection.

Refer next to FIG. 5 which shows the monitor used for D.C. over voltage protection. Again, the setup is much the same as that in FIG. 3, the major difference being that the monitor sense winding 29 is in parallel with the load so as to sense the voltage across the load 100. A current-limiting resistor 130 is connected in series with the winding 29.

More specifically, the current through the monitor sense winding 29 is proportionate to the voltage output from power supply 90. The biasing resistor 48 is set so that the monitor 92 will operate when the desired voltage limit is reached. As before, an output pulse at terminal 68 will unblock the rectifier 108 to energize the overload relay 122. This, in turn, will de-energize the overload relay 128 by opening switch 124. Switch 65 will then open to disconnect the system as described above.

Figure 6:
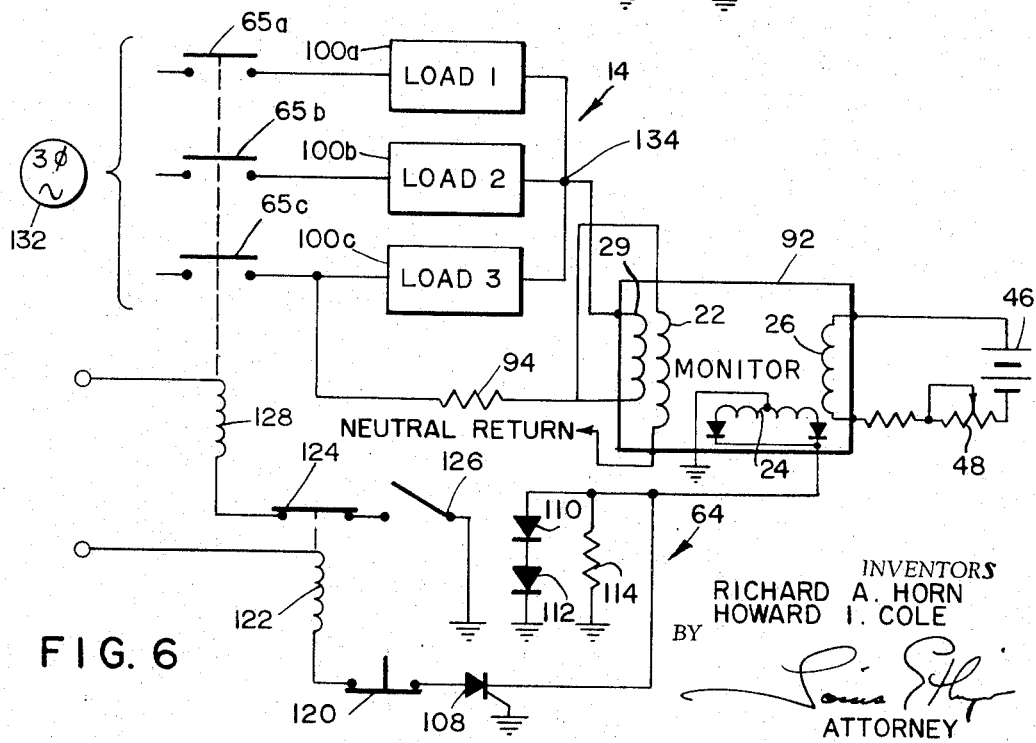
FIG. 6 is a schematic diagram showing the monitor used for overload protection in a three-phase circuit.

FIG. 6 shows use of the monitor to sense the loss of current in any phase of a three-phase Y-connected power system. The setup is very much the same as the A.C. overload protection system illustrated in FIG. 4. Three loads, 100a, 100b and 100c are connected to the three arms of a three-phase Y-connected A.C. source. Three power relay switches 65a, 65b and 65c are included in the three respective arms. These are actuated in unison by the relay coil 128. The sense winding 29 is in series in the neutral line of the three-phase system, one connection being made at a terminal 134 on load end of the system and the other at the neutral return in the three-phase source 132.

If all three phases are operating properly, due to the electrical symmetry of the system, the neutral return current through the monitor 92 will be zero or a small finite value. With the loss of power in any one of the three phases, however, the electrical symmetry is upset and substantial current will flow in the neutral line. This current will be sensed by the monitor 92 and the power relay switches 65 A.C. will be opened exactly as described above.

Figure 7:
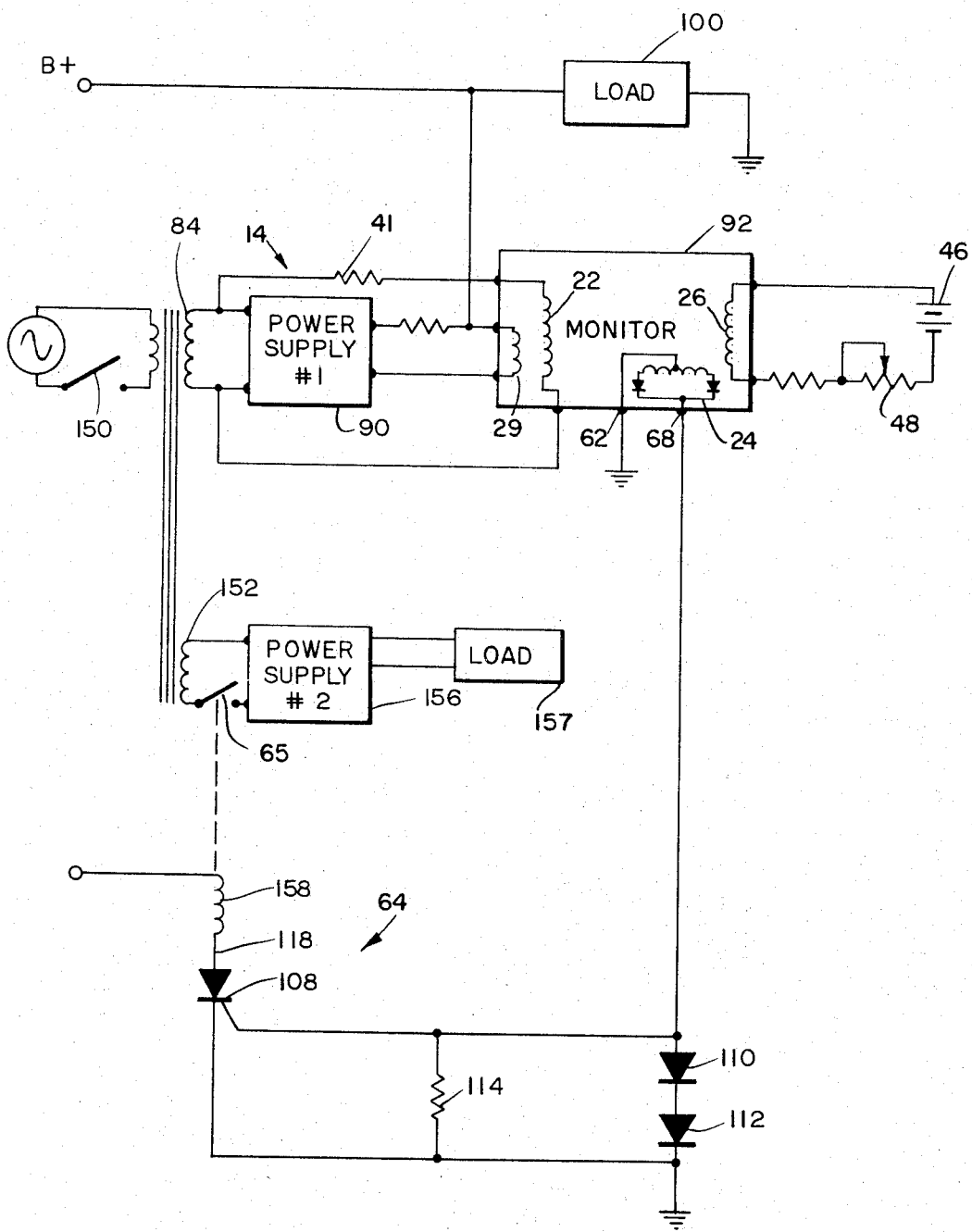
FIG. 7 is a similar diagram showing the monitor used to program a sequence of events.

FIG. 7 shows the monitor 92 in use to sense the output from one power supply and to turn on a second power supply only if a predetermined output is received from the first supply. The setup here is very much the same as the D.C. over voltage protection system illustrated in FIG. 5, except that a conventional on-off switch 150 is located in the primary circuit of transformer 84. Also, the transformer 84 has a secondary winding 152 which is connected by way of a relay switch 65 to a second power supply 156. Supply 156 powers a second load 157. The anode 118 of the silicon controlled rectifier 108 is connected to one end of a relay coil 158 whose other end is connected to a positive voltage supply.

The monitor 92 is adjusted through its bias resistor 48 to operate with a normal voltage output from power supply 90. When the voltage output from power supply 90 exceeds the predetermined preset value, an output signal at winding terminal 68 unblocks the silicon controlled rectifier 108 and energizes the relay coil 158 closing the switch 65 to power supply 156.

Thus, power supply 156 cannot be turned on until a predetermined output has been received from power supply 90. This sequence is highly advantageous in applications where damage will result from the presence of one voltage (e.g., plate voltage on a voltage on a vacuum tube) without the presence of a second voltage (e.g., adequate grid bias on the tube).

It will be appreciated from the foregoing that our monitor has many varied applications. It may be used to sense current or voltage in a circuit without drawing any appreciable power from that circuit. Actually, its own power consumption is low, on the order of ½ watt, making for efficient operation. Further, it has a very fast response time. One unit which has been built has a response time of only 20 microseconds. The same unit is temperature stable with an output variation less than ±7½% over a temperature range of −50° to +130°. Further, it can sense any available voltage and at any frequency from D.C. up to 20 kc. or even higher.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and secured by Letters Patent is:

1. A magnetic circuit monitor responsive to an abnormal condition in a monitored circuit, said monitor comprising:
    (A) magnetic core means having saturated and unsaturated conditions of magnetization,
    (B) an output winding on said core means,
    (C) means for producing a continuous periodically varying magnetic field in said core means, said field inducing a voltage in said output winding only when said core means is in said unsaturated condition,
    (D) means for magnetically biasing said core means toward said saturated condition of magnetization,
    (E) a field winding on said core means for connection to said monitored circuit, said biasing means and said field winding being arranged so that
        (1) with a predetermined normal current flow through said field winding, said core means is maintained in said saturated condition of magnetization, and
        (2) with a predetermined abnormal current flow through said field winding, said core means is driven to said unsaturated condition of magnetization,
        (3) said condition change being indicated by a voltage appearing across said output winding.

2. A magnetic circuit monitor for sensing an abnormal condition in said circuit, said monitor comprising:
    (A) magnetic core means having saturated and unsaturated conditions of magnetization,
    (B) an output winding on said core means,
    (C) means for producing a continuous periodically pulsating unidirectional magnetic field in said core means,
        (1) said field being sufficient to saturate said core means,
        (2) said field producing a voltage in said output winding only when said core means is in said unsaturated condition,
    (D) a field winding on said core means, said field winding being connected in said circuit being monitored so that current, either A.-C. or D.-C., from said circuit flows through said field winding,
    (E) means for magnetically biasing said core means so that
        (1) a predetermined normal current in said field winding maintains said core means in said saturated region, and
        (2) a predetermined abnormal current in said field winding drives said core means sufficiently toward said unsaturated region that said pulsating field produces a voltage in said output winding.

3. A magnetic circuit monitor as defined in claim 2 including output means responsive to the voltage across said output winding.

4. A magnetic circuit monitor for sensing an abnormal condition in said circuit, said monitor comprising:
    (A) a pair of magnetic cores having saturated and unsaturated conditions of magnetization,
    (B) an output winding on each of said cores,
    (C) means for producing a periodically pulsating magnetic field alternately in each of said cores,
        (1) said fields having opposite polarity,
        (2) the pulsating magnetic field in each said core inducing a substantial alternating voltage across the corresponding output winding only when that core is in said unsaturated condition,
    (D) a field winding on said cores, said field winding being connected to said circuit being monitored so that current from said circuit flows through said field winding,
    (E) means for magnetically biasing said cores so that
        (1) normal current in said field winding maintains said cores in said saturated condition of magnetization, and
        (2) abnormal current in said field winding drives said cores sufficiently toward said unsaturated condition of magnetization that said pulsating field produces an alternating voltage across said output windings.

5. A magnetic circuit monitor as defined in claim 4 including output means responsive to the voltage across said output winding.

6. A magnetic circuit monitor as defined in claim 4 wherein said magnetic field pulses in said two cores produce equal and opposite voltages in said field winding.

7. A magnetic circuit monitor comprising:
(A) first and second magnetic cores, said cores having saturated and unsaturated conditions of magnetization,
(B) an output winding on said cores,
(C) means for producing magnetic field pulses alternately in each of said cores,
  (1) said pulses being of sufficient magnitude to maintain said cores in the saturated condition in the absence of other applied fields,
  (2) said pulsating field in each of said cores inducing an alternating voltage across the output winding of the corresponding core only when that core is in said unsaturated condition,
(D) a field winding on said cores, said field winding being connected in the circuit being monitored so that current from said circuit is carried by said field winding,
(E) means for magnetically biasing each of said cores so that
  (1) predetermined normal current in said field winding maintains said cores in said saturated region of magnetization, and
  (2) abnormal current in said field winding drives said cores sufficiently toward said unsaturated region of magnetization that said pulsating field in each of said cores produces an alternating voltage across said output winding.

8. A magnetic circuit monitor as defined in claim 7 wherein said biasing means comprises:
(A) a winding on each of said cores, and
(B) a variable direct current source connected to said windings.

9. In combination, the magnetic circuit monitor as defined in claim 7 and an output circuit comprising:
(A) means for rectifying the alternating output voltage appearing across said output winding, and
(B) means for controlling said monitored circuit in response to a voltage across said output winding.

10. The combination defined in claim 9 wherein said controlling means comprises:
(A) a silicon controlled rectifier connected to be unblocked by a signal from said rectifying means,
(B) a voltage source, and
(C) switch means connected between said voltage source and said silicon controlled rectifier so that a voltage appearing across said output winding unblocks said silicon controlled rectifier and thereby actuates said switch means.

11. The combination defined in claim 10
(A) wherein said monitored circuit comprises
  (1) a first power supply, and
  (2) a first load, said first load and said monitor field winding being connected in parallel to said first power supply so that said monitor responds to the voltage applied to said load, and
(B) further including
  (1) a second load, and
  (2) a second power supply connected between said switch means and said second load so that when the voltage applied to said first load reaches a predetermined value said switch means causes said second power supply to energize said second load.

12. The combination defined in claim 10 wherein
(A) said monitored circuit comprises
  (1) a power supply, and
  (2) a load connected to said power supply in series with said field winding so that the current through said load flows through said field winding, and
(B) said switch means is connected to said power supply so that whenever the current through said load exceeds a predetermined value said switch means de-energizes said load.

13. The combination defined in claim 10 wherein
(A) said monitored circuit comprises
  (1) an alternating voltage source,
  (2) a load connected in series between said alternating voltage source and said field winding,
(B) said switch means is connected between said source and said monitor so that whenever the peak value of the current through said load exceeds a predetermined value said switch means de-energizes said load.

14. The combination defined is claim 10 wherein
(A) said circuit being monitored comprises
  (1) a power supply, and
  (2) a load connected to said power supply in parallel with said field winding so that the current flowing through said field winding varies proportionately with the output voltage from said power supply, and
(B) said switch means is connected to said power supply so that when the voltage from said power supply exceeds a predetermined value, said switch means de-energizes said load.

15. The combination defined in claim 10, wherein
(A) said monitored circuit comprises
  (1) a three-phase Y-connected source, and
  (2) three loads connected in series between the three phases of said source and said monitor field winding so that the neutral return current of said source flows through said field winding, and
(B) said switch means is connected in the three phases of said source so that whenever current flows through said field winding said switch means de-energizes all of the said loads.

16. A magnetic circuit monitor comprising:
(A) first and second magnetic cores having saturated and unsaturated conditions of magnetization and sharp transition points between said two conditions,
(B) an output winding on said first and second cores,
(C) a gate winding
  (1) a first portion of said gate winding being on said first core, and
  (2) a second portion of said gate winding being on said second core,
(D) means for supplying periodically pulsating current to said gate winding portions,
  (1) said current in said gate winding portions being such as to magnetically bias said cores to saturation in the absence of other applied fields,
  (2) the current in each gate winding portion producing a voltage in the output winding only when the corresponding core is in said unsaturated condition,
(E) a sense winding,
  (1) a first portion of said sense winding being on said first core, and
  (2) a second portion of said sense winding being on said second core,
(F) a bias winding,
  (1) a first portion of said bias winding being on said first core, and
  (2) a second portion of said bias winding being on said second core,
(G) means for supplying a bias current to said bias winding,
(H) means for regulating the current in said bias winding so that
  (1) with predetermined normal current in said field winding said cores are maintained in said saturated region of magnetization, and (2) with a predetermined abnormal current in said field winding said cores are driven sufficiently toward said unsaturated condition of magnetization that said pulsating current in each of said cores produces an alternating voltage across said output winding.

17. A magnetic circuit monitor as defined in claim 16 wherein said first and second sense winding portions are connected in series so that no net voltage is induced therein from said gate winding.

18. A magnetic circuit monitor as defined in claim 17 wherein said first and second bias winding portions are connected in series so that the magnetic fields produced by the current therein oppose the magnetic fields produced by the current in said sense winding portions.

19. A magnetic circuit monitor for sensing abnormal current or voltage in a monitored circuit, said monitor comprising:
(A) first and second magnetic cores, said cores having a magnetic hysteresis curve characterized by a relatively sharp transition between the saturated and unsaturated regions of said curve,
(B) three field windings, each of said field windings having a winding portion on said first and second cores,
(C) an output winding on said cores,
(D) means for supplying pulsating unidirectional current to a first one of said field windings, said pulsating current producing a voltage in said output winding only when said cores are in the unsaturated region of said curve,
(E) means for supplying bias current to a second one of said field windings,
(F) means for connecting the third one of said field windings to the monitored circuit so as to carry current therefrom,
(G) the operating point of said cores on said curve being determined by the algebraic sum of the ampere turns in said second and third windings and the peak value of the ampere turns in said first winding,
(H) said biasing means being arranged to supply current to said second field winding so as to maintain the operating point of said cores sufficiently far in the saturated region of said curve during normal values of current in said third winding that said peak value of the ampere turns in said first winding does not shift said operating point into the unsaturated region of said curve,
(I) said cores being driven sufficiently toward the unsaturated region of said curve whenever the current in said third winding exceeds a predetermined limit that the peak value of the ampere turns in said first winding drives said cores into the unsaturated region of said curve during at least a part of each cycle of the alternating component of said pulsating current, thereby producing a voltage across said output winding.

20. A magnetic circuit monitor as defined in claim 19 including output means responsive to the voltage across said output winding.

References Cited

UNITED STATES PATENTS

| | | | |
|---|---|---|---|
| 2,700,125 | 1/1955 | King et al. | 323—56 X |
| 2,746,000 | 5/1956 | Wegener | 323—56 X |
| 3,165,671 | 1/1965 | Mintz et al. | 317—27 |
| 3,202,875 | 8/1965 | Bateman | 317—18 |
| 3,213,321 | 10/1965 | Dalziel | 317—18 |
| 3,214,638 | 10/1965 | Moser et al. | 317—18 |

MILTON O. HIRSHFIELD, *Primary Examiner.*

R. V. LUPO, *Assistant Examiner.*